R. P. LINK.
LIQUID DISPENSING MACHINE.
APPLICATION FILED JUNE 20, 1913.

1,100,586.

Patented June 16, 1914.
6 SHEETS—SHEET 1.

R. P. LINK.
LIQUID DISPENSING MACHINE.
APPLICATION FILED JUNE 20, 1913.
1,100,586.
Patented June 16, 1914.
6 SHEETS—SHEET 2.
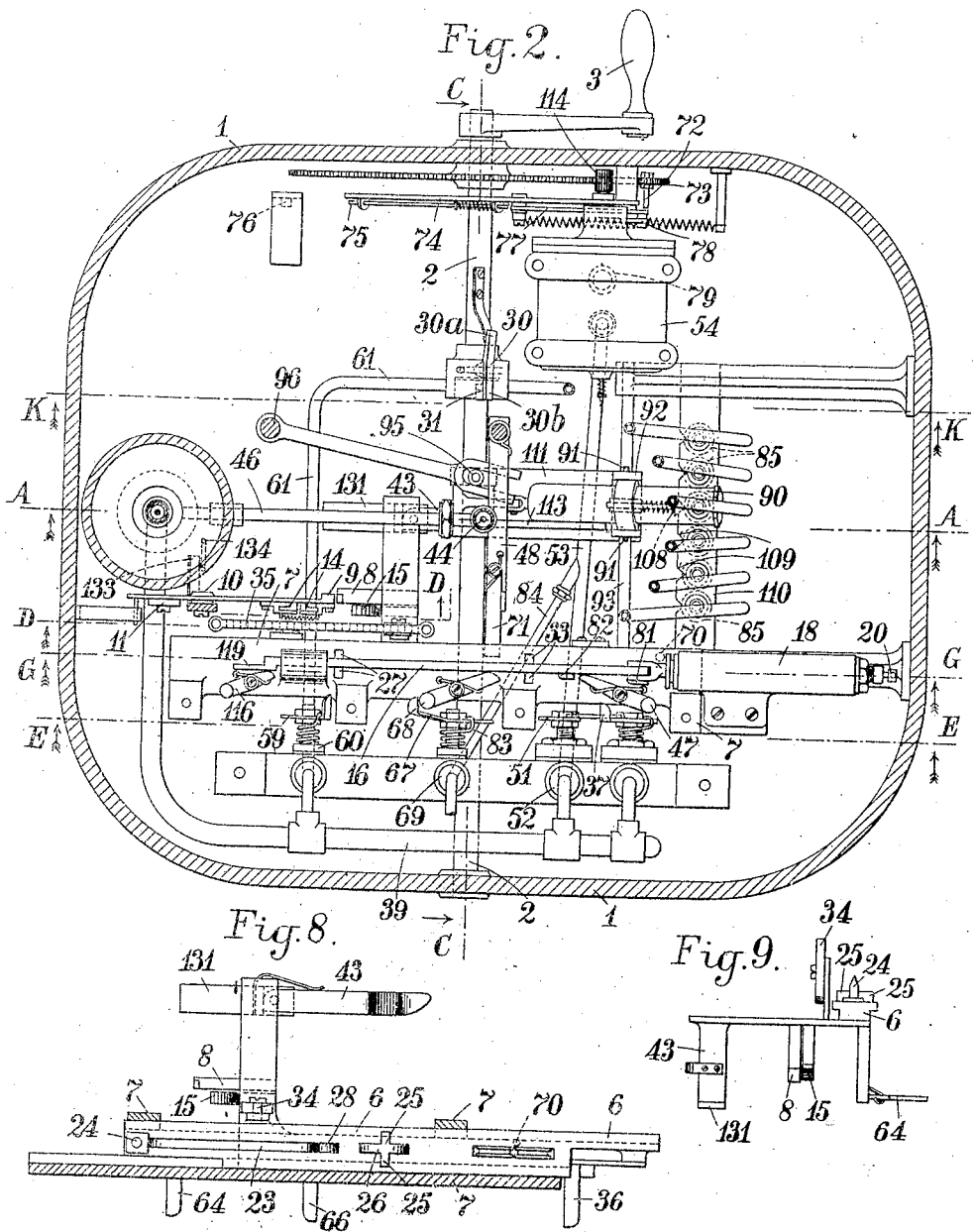
Witnesses:
M. E. McDade.
Inventor
Rolls P. Link
by
James L. Norris
Attorney

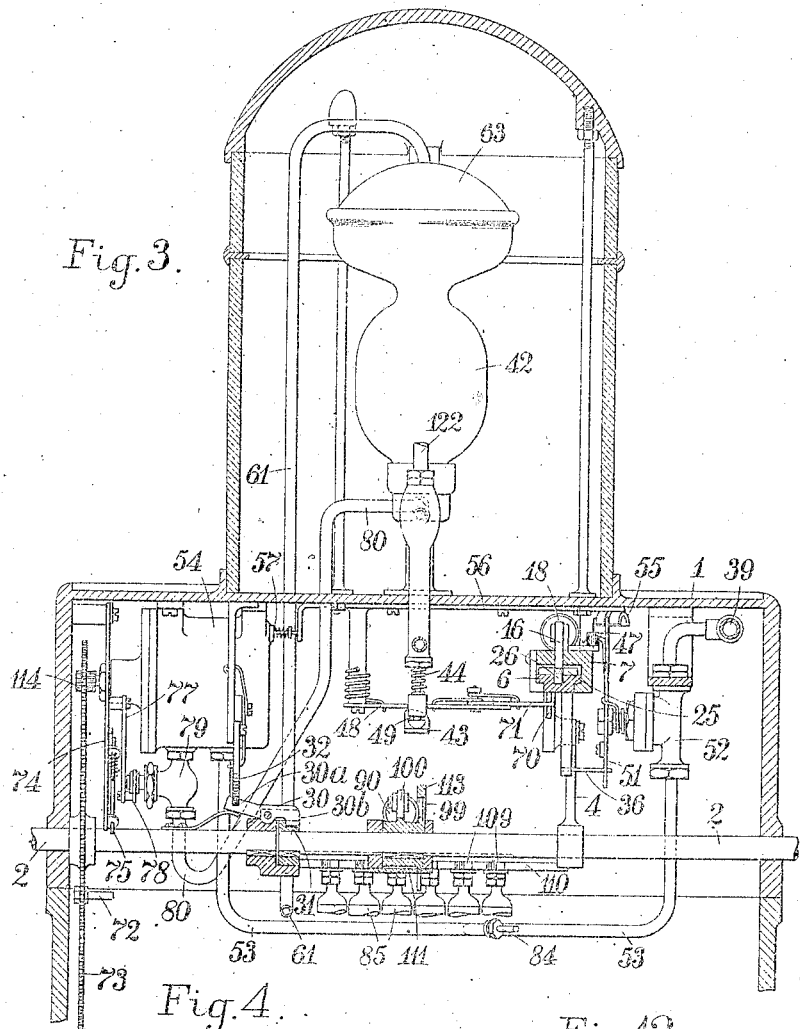

R. P. LINK.
LIQUID DISPENSING MACHINE.
APPLICATION FILED JUNE 20, 1913.
1,100,586.
Patented June 16, 1914.
6 SHEETS—SHEET 4.
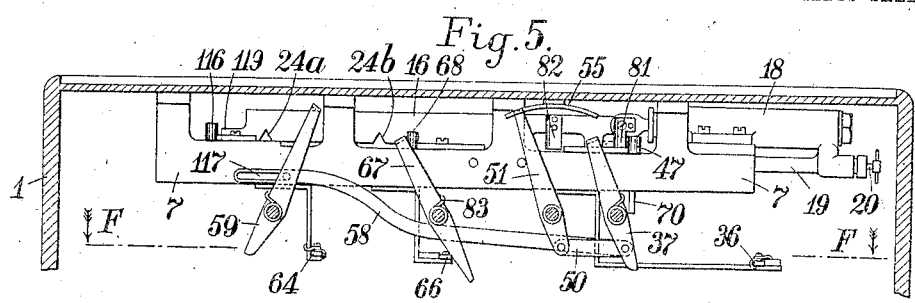
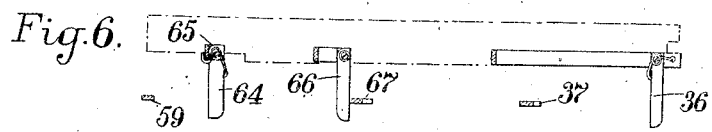
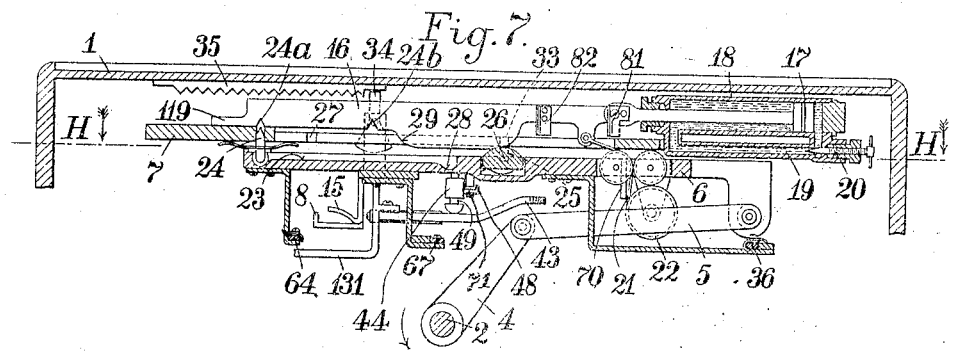
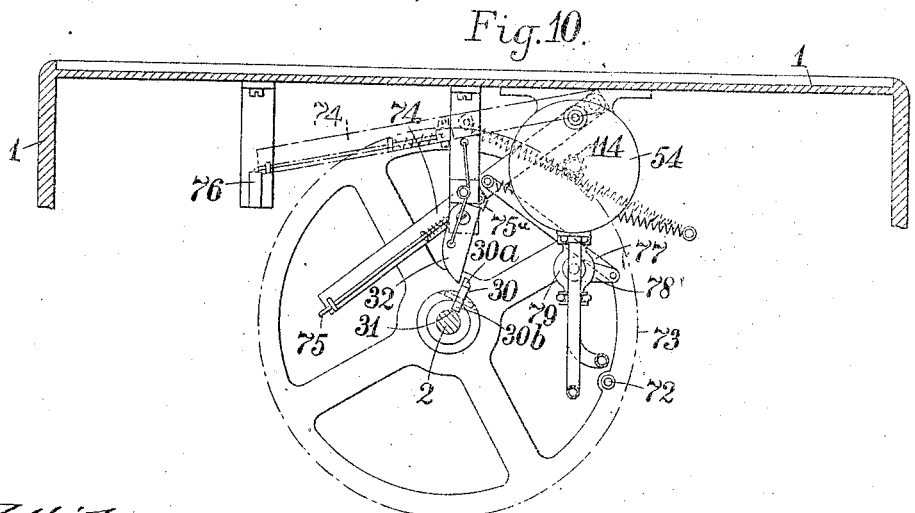
Witnesses
M. E. McDade
Inventor
Rolls P. Link
by
James L. Norris
Attorney

R. P. LINK.
LIQUID DISPENSING MACHINE.
APPLICATION FILED JUNE 20, 1913.

1,100,586.

Patented June 16, 1914.
6 SHEETS—SHEET 5.

Witnesses:

Inventor
Rolls P. Link
by James L. Norris
Attorney

R. P. LINK.
LIQUID DISPENSING MACHINE.
APPLICATION FILED JUNE 20, 1913.

1,100,586.

Patented June 16, 1914.
6 SHEETS—SHEET 6.

UNITED STATES PATENT OFFICE.

ROLLS PERCIVAL LINK, OF WINCHMORE HILL, ENGLAND.

LIQUID-DISPENSING MACHINE.

1,100,586.

Specification of Letters Patent.

Patented June 16, 1914.

Application filed June 20, 1913. Serial No. 774,930.

*To all whom it may concern:*

Be it known that I, ROLLS PERCIVAL LINK, a subject of the King of Great Britain, residing at Winchmore Hill, Middlesex, England, have invented a new and useful Liquid-Dispensing Machine, of which the following is a specification.

This invention relates to an improved refreshment fountain or like liquid measuring and delivering machine for supplying differently flavored drinks.

The improved machine comprises a mixing vessel, a number of vessels each supplying a differently flavored flavoring material and mechanism by means of which, after a preliminary setting to establish communication between the mixing vessel and a selected vessel supplying flavoring material, on turning a handle, a supply of rinsing water is first delivered into the mixing vessel and then drained away, after which a measured quantity of flavoring material, unaerated water, and a further quantity of water with which an aerating gas has been previously mixed in a separate chamber, are delivered into and mixed in said vessel from which the drink thus prepared can then be drawn off.

Figures 1, 11:
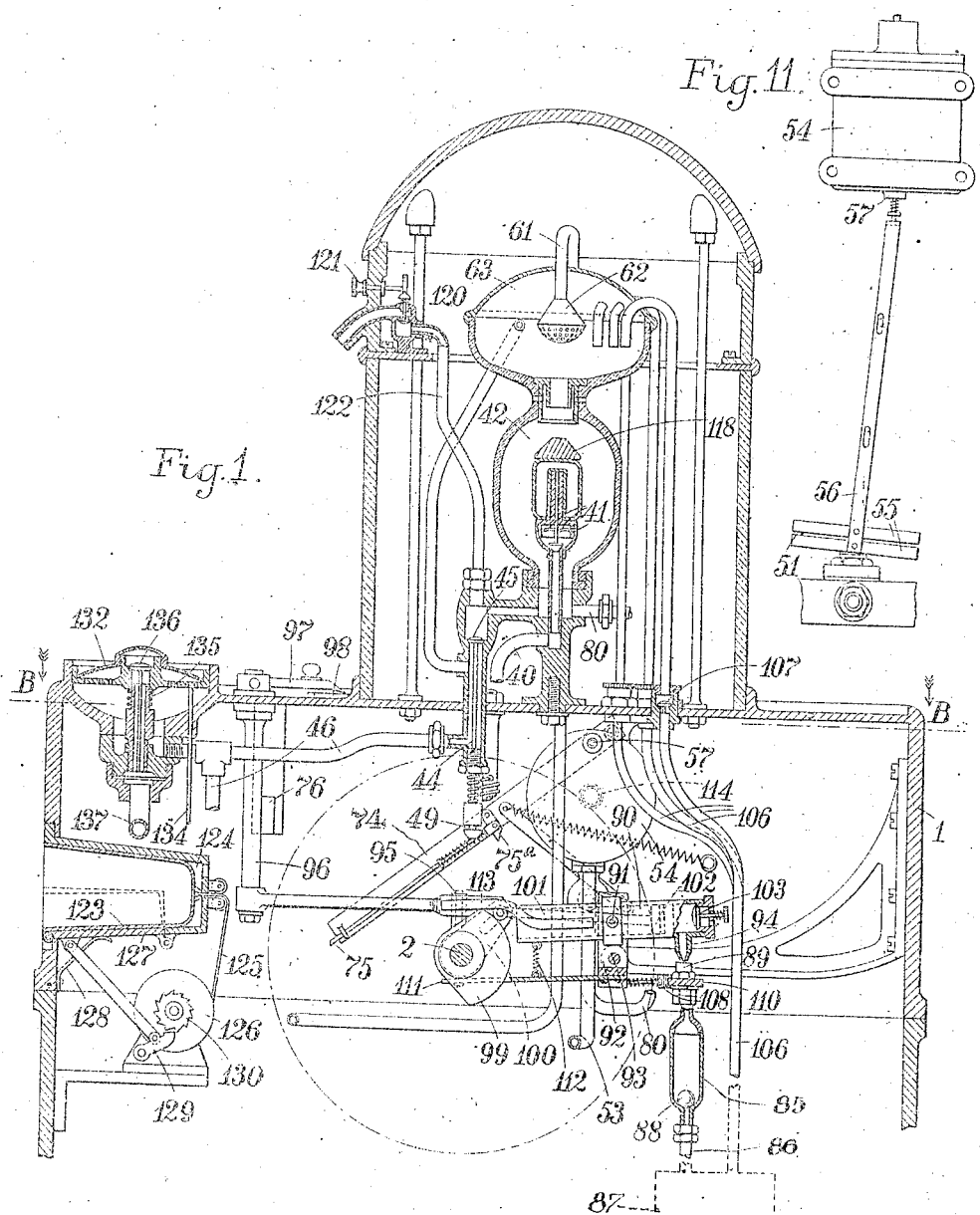
Figure 13:
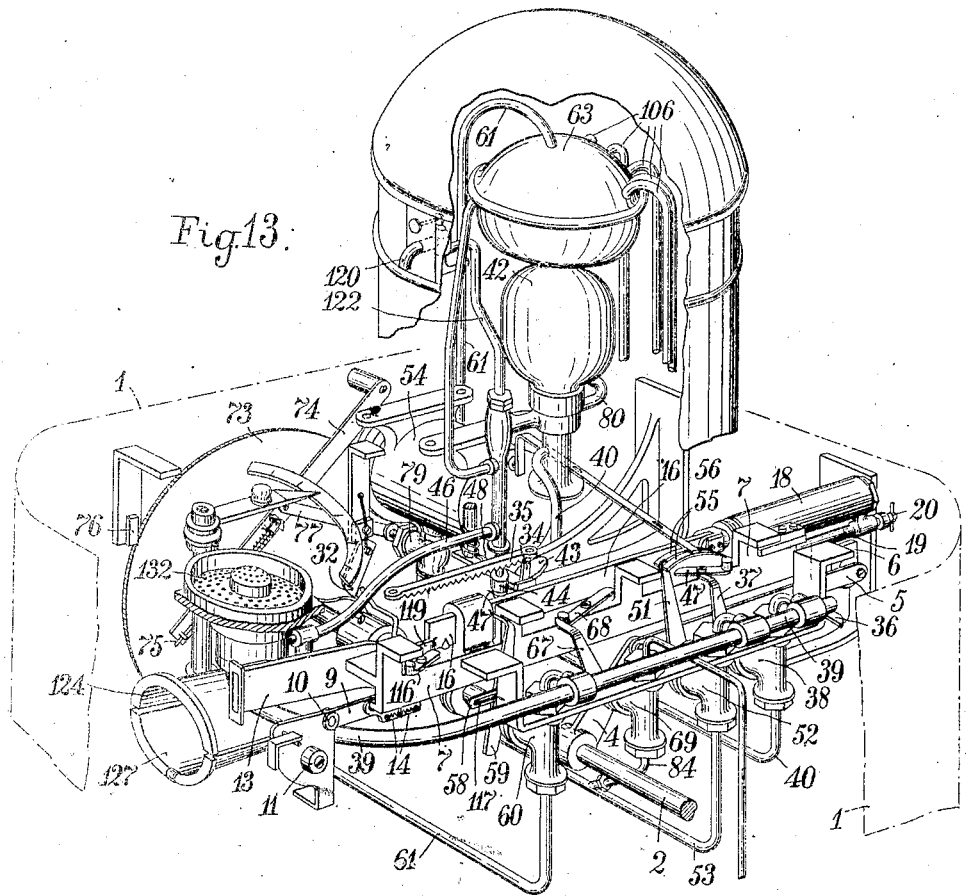
Figure 14:
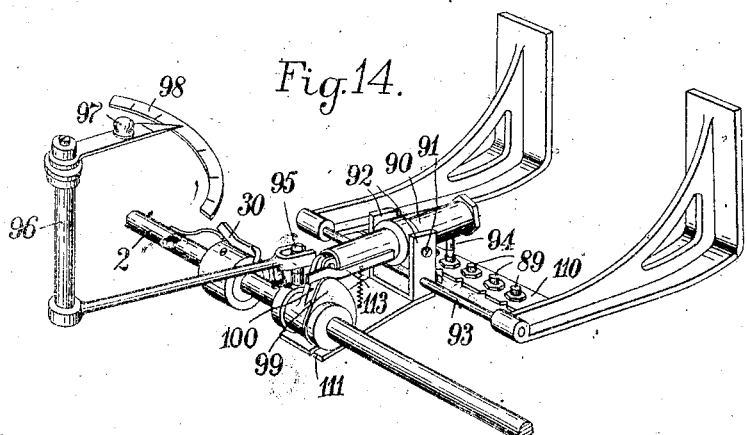
Figure 15:
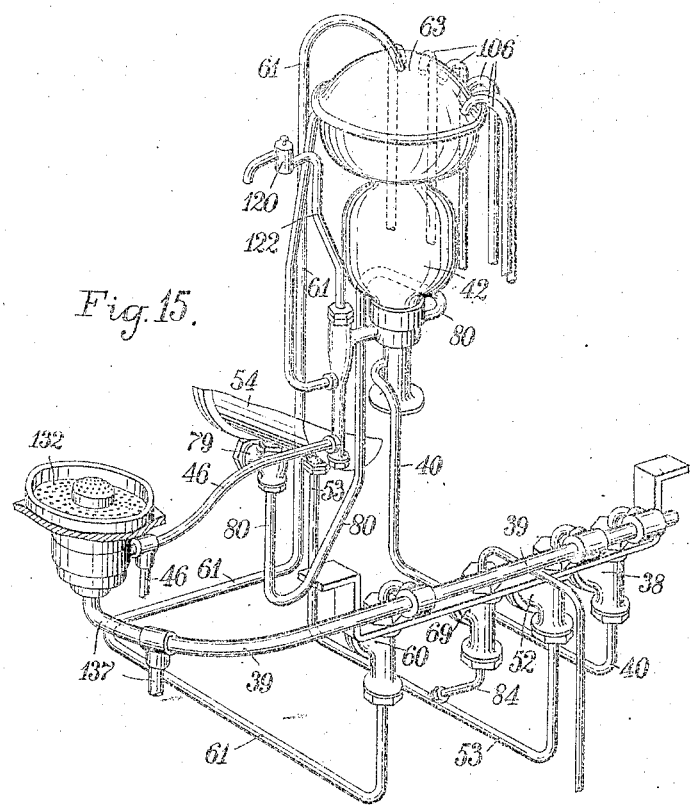

In the accompanying drawings:—Figure 1 shows a convenient constructional form of the improved machine in vertical section on the line A—A, Fig. 2. Fig. 2 shows a plan thereof in section on the line B—B, Fig. 1. Fig. 3 shows a vertical section of the machine on the line C—C Fig. 2. Fig. 4 is a detail view, in section on the line D—D Fig. 2. Fig. 5 shows a section taken on the line E—E, Fig. 2, and Fig. 6 shows a section taken on the line F—F, Fig. 5. Fig. 7 shows a section taken on the line G—G, Fig. 2. Fig. 8 is a partial plan view corresponding to a section on the line H—H Fig. 7. Fig. 9 is an end view of the parts shown in Fig. 8. Fig. 10 shows a section on the line K—K, Fig. 2. Figs. 11 and 12 are detail views hereinafter referred to. Fig. 13 is a general perspective view of the operative parts of the machine. Fig. 14 is a detail perspective view of the means for selecting the flavoring material, and Fig. 15 is a perspective view of the fluid conduits and valves shown detached from the mechanical operating devices.

As shown, the machine comprises a casing 1 in which is mounted a rotatable shaft 2, having an operating handle 3 mounted thereon. The shaft 2 is connected by a crank-arm 4 and link 5 (Figs. 3 and 7) to a draw bar 6 slidably mounted in guides 7. The draw bar and shaft are locked against movement by a stop 8 (Figs. 4 and 7) encountering an abutment bar 9 pivoted at 10 and carrying a counter-weight 11. On introducing a coin 12 through a coin passage 13 into a coin cup comprising pivoted members 14, 14 the abutment bar 9 is lowered to the position shown in Fig. 4 setting free the stop 8. By turning the shaft 2 in the direction indicated by the arrow Fig. 7, the draw bar 6 is moved to the left carrying a coin ejector 15 across the coin which is thus pushed through between the members 14 which yield and release the coin so that the abutment bar is raised by the weight 11 when the draw bar returns to its initial position as hereinafter described. In the guides 7 there is also mounted a dash-pot bar 16 connected to a piston 17 working in a cylinder 18 filled with a liquid which is forced from end to end of the cylinder, by the movements of the piston 17, through a conduit 19 controlled by an adjustable valve 20 to regulate the speed of movement of the said bar 16 which is also connected to the draw bar 6 by a cord 21 wound on a spring-actuated roller 22 arranged to wind up the cord.

As the draw bar moves to the left, Fig. 7, a cam surface 23 thereon forces a spring-controlled pin 24 into a notch 24ª in the dash-pot bar 16 and thus locks the latter to the guides 7. When the bar 6 reaches its left hand limit lateral lugs 25 (Fig. 8) on a spring pressed latch 26 enter slots 27 in the guides 7 and lock the said bar to the said guides. At the same time a notch 28 at the rear end of the cam surface 23 has been brought directly beneath the pin 24 which descends thereinto leaving the bar 16 free to be moved to the left by the pull of the cord 21 which has been unwound from roller 22 during this movement of bar 6, and under the restraint of the piston 17. There is thus a compulsory pause in the movement of the bar 6 until a cam surface 29 on the bar 16 moves over and releases the latch 26, this action taking place during the movement of bar 16 to the left. When the latch 26 is disengaged from the slots 27 the bar 6 can be returned to its initial position by rotating the shaft 2 in the opposite direction to that indicated by the arrow in Fig. 7, and is locked at the end of its stroke by the lugs 25 entering slots 33 in guides 7. The bar 16 which has previously been locked in place during the return movement of bar 6 by the pin 24 being raised into a notch 24$^b$, due to the passage of cam 23 therebeneath, is released when the notch at the front end of said cam is reached and follows the bar 6 being drawn along by the cord 21 and restrained by the piston 17. The draw bar 6 is prevented from reversing its direction of motion until it has completed its stroke in either direction by a swinging pawl 34 and a rack 35 fixed to the casing 1.

As the bar 6 moves to the left a tappet 36 thereon moves a spring-pressed valve controlling lever 37 (Figs. 2 and 5) and opens a valve 38 so that water from a main supply pipe 39 passes through a pipe 40 (Figs. 1, 2 and 13), and issues through distributing orifices 41 into the interior of a mixing vessel 42 to rinse the same. A cam plate 43 which is connected to bar 6, as shown in Fig. 8, for movement therewith, is carried forward with said bar so as to engage and raise a valve rod 44 and thereby open a valve 45 to allow this rinsing water to drain away through the conduits 46. The lever 37 when moved as above described is retained in this position by a latch 47 after the tappet 36 has passed the end of the said lever. As the rod 44 rises, a spring pressed bar 48 enters a notch 49 therein to hold the valve 45 open.

The lever 37 is coupled by a link 50 to a lever 51 which opens a valve 52 allowing water to pass through a pipe 53 to a beater chamber 54. One end of the lever 51 engages an inclined slot between bars 55 fixed on a rod 56 (Figs. 3, 11 and 13) which is thereby moved to open a relief valve 57 to permit escape of air or gas from the chamber 54. The lever 37 is also coupled by a rod 58 to a spring-pressed valve lever 59 which admits water through a valve 60 and conduit 61 to a spraying device 62, to rinse a vessel 63 the bottom of which opens into the mixing vessel 42.

In addition to the tappet 36, the draw bar 6 is provided with a pair of pivoted tappets 64 and 66, (Figs. 5 and 6), the tappet 64 being controlled by a spring 65 and being located to the rear of the lever 59, while the tappet 66 is located in front of a spring-pressed valve lever 67. The functions of these two tappets will be hereinafter explained, but it may be stated that during the forward or left-hand movement of bar 6, the tappet 66 is moved away from the lower end of lever 67, (which latter is normally locked in the position shown in Fig. 5 by a latch 68, Figs. 2, 5 and 13), while the tappet 64 strikes against the lower end of lever 59 and rocks idly past the same. There is also a still further tappet 70 on bar 6 which depends therefrom, and, during the above specified movement of said bar, strikes against and idly rocks to the left a spring-controlled pivotally mounted member 71 constituting an extension of bar 48. The above-mentioned lever 67 controls a valve 69, (Fig. 13), which remains closed during the time that said lever occupies the position represented in Fig. 5.

By rotating the shaft 2 in the direction indicated by the arrow (Fig. 7) a pin 72 (Fig. 10), on a gear wheel 73 is brought against an arm 74 pivoted at its upper end to casing 1 and raises the said arm until the outer end of a spring-controlled latch 75 thereon passes above a plate 76, against which it is caused to strike during the upward movement of the arm, thus holding the arm raised. Arm 74 is connected by a link 77 and arm 78 with a valve 79 in a conduit 80 leading from the beater chamber 54 to the mixing vessel 42, this valve being closed by said parts 77 and 78 when said arm is raised.

The valves 38, 45, 52, 57 and 60 remain open after the bar 6 has completed its movement to the left, during a period determined by the rate of travel of the bar 16 after the latter has been released by the pin 24, until a lug 81 thereon releases the catch 47, whereupon lever 37 is returned by the action of its controlling spring and, owing to its connection with levers 51 and 59, brings about their return also, so that the valves 38, 52, 57 and 60 close. As a result of the movements described, the vessels 42 and 63 have been rinsed and drained, and the beater chamber 54 has been charged with water. The draining valve 45 remains open. During further movement of the bar 16, a lug 82 thereon withdraws the latch 68 from the lever 67 which is turned by its spring 83 and opens the gas valve 69 so that compressed gas passes from a suitable source of supply through a pipe 84 to the pipe 53, and thence to the beater chamber 54. The bars 6 and 16 having both arrived at the left hand ends of their respective paths of travel, the bar 6 is unlocked by the cam 29 depressing the latch 26 and both bars can be returned to their initial positions by turning the shaft 2 in the opposite direction to that indicated by the arrow in Fig. 7.

The shaft 2 is made in two parts connected by a clutch comprising a pivoted latch 30 on one part pressed by a spring into a notch 31 in the other part (Figs. 2, 3 and 10). As the shaft 2 rotates, carrying the bar 6 toward the right (Fig. 7), the end 30$^a$ of the latch 30 engages the trip 32 and is depressed thereby so that the end 30$^b$ is disengaged from the notch 31 leaving the part of the shaft remote from the handle 3, at rest. The rotation of the handle 3 in this direction, with the adjacent part of the shaft carrying the gear 73, can then continue until after the latch end 30$^a$, which is then held toward the axis of the shaft by the end 30$^b$ traveling on the surface of the part of the shaft which is at rest, has passed under the spring-pressed trip arm 32, and until the end 30ᵇ drops into the notch 31 whereupon the shaft is locked both by the latch 30, and by the engagement of stop 8 with bar 9, until another coin is inserted. When the handle 3 is turned a pinion 114 meshing with the gear 73, rotates a beater in the chamber 54 so that if this chamber contains charges of water and an aerating gas the solution of the gas in the water is accelerated. The latch 30 allows the handle 3 to be turned as hereinabove described through a distance greater than that necessary to move the bar 6 through its full stroke, in order that a sufficient action of the beater can be obtained.

As shown in Figs. 1, 2 and 3, a number of measuring chambers 85 are provided each communicating through a corresponding pipe 86 with a different reservoir 87 (Fig. 12) containing flavoring material. Each chamber 85 contains a float valve 88 and is open at its upper end through a socket 89. A cylinder 90 (Figs. 1 and 14) mounted on trunnions 91 in a frame 92 movable on guide 93, has a nozzle 94 which moves over the sockets 89 during the travel of the said cylinder and its frame, such travel being due to the provision of a connection 95 between said frame and a shaft, 96, the latter having a handle, 97 exterior to the casing 1 and moving over a suitably marked dial 98. Thus the nozzle can be brought above a selected measuring chamber before the mechanism controlled by the handle 3 is set in operation. When the shaft 2 is turned, a cam 99 thereon tilts the cylinder 90 so that the nozzle 94 is pressed into the socket 89 directly below it. A crank arm 100 (Fig. 1) the effective length of which can be varied, is connected by a rod 101 to a piston 102 in the cylinder 90, by means of which piston air is withdrawn from the chamber 85 in order to draw flavoring material by suction into said chamber through pipe 86 until the float valve 88 reaches the top of the chamber. A loaded valve 103 then opens to admit additional air, and also to prevent excessive suction and consequent leakage at the valve 88. The flavoring material is drawn in through a check valve 104 (Fig. 12). When the piston 102 is moved in the opposite direction the air expelled from the cylinder 90 forces flavoring material out of the chamber 85 and past a check valve 105 through a pipe 106 into the vessel 63. Another check valve 107 (Fig. 1) is provided in the pipe 106 the valves 105 and 107 acting to keep the pipe 106 charged so that a definite quantity of flavoring material is expelled at each actuation of the piston 102, the chamber 85 being closed by the valve 88 when empty.

Alinement of the nozzle 94 with any selected socket 89 is insured by a spring pin 108 (Fig. 1) entering one of the notches 109 in a bar 110 supporting the sockets 89. A plate 111 is secured to frame 92 for movement therewith, and the cam 99 works through a slot in this plate and is, in consequence, shifted laterally by said plate along shaft 2 in accordance with the movements of said frame. Plate 111 has a spring connection 112 with the cylinder arm 113, whereby said arm is held against the periphery of cam 99. During the forward or left-hand movement of bar 6, the tappet 70 rocks the pivot member 71 idly, without producing any movement of bar 48, but when said bar 6 makes its return movement and the tappet again engages member 71, it will press the latter against a shoulder on bar 48, and in consequence will rock the said bar 48 counter-clockwise, (Fig. 2), thereby disengaging it from notch 49 in the valve rod 44, whereupon said rod will drop and close valve 45. The crank arm 100 commences to move the piston 102 to eject the flavoring material into the vessel 63 as above mentioned. The tappet 64 then opens the valve 60 a slot 117 in the rod 58 permitting this to be done without moving the levers 37 and 51. The valve 60 is in this instance locked by the latch 116 (Figs. 2 and 13) but this valve is not so locked when moved by the rod 58. When the valve 60 opens water is supplied to the spraying nozzle 62 to wash the flavoring material into the vessel 42. This water, together with aerated water from the chamber 54 lifts a float valve 118 which closes the vessel 42 when filled to the proper extent. The aerated water just referred to, is supplied to vessel 42 consequent upon the opening of the valve 79 produced by the disengagement of latch 75 from plate 76 and the subsequent downward movement of arm 74, the release of said latch being effected by the engagement, during the rotation of gear 73, of pin 72 with a trigger 75ᵃ to which the inner end of the latch is pivoted, whereby it is retracted until its outer end is withdrawn from said plate. On further movement of the bar 6 the tappet 66 closes the valve 69 which becomes locked by the latch 68, and finally the bar 16 following the bar 6 closes the valve 60 by a lug 119 releasing the latch 116. The chamber 42 is now charged with flavored aerated water, the valves 45 and 118 are closed, and by opening the valve 120 by means of the handle 121, the beverage is expelled through the pipe 122 by the pressure of the gas escaping from the water, this pressure holding the valve 118 closed until the vessel 42 is emptied. The parts are now in their initial positions ready to repeat the cycle of operations hereinabove described.

To receive the beverage discharged from pipe 122, there is provided a cup 123 which is attached to the machine and normally rests in a recess 124 into which it is drawn by a cord 125 wound up by a spring roller 126. When the cup is removed a part 127 of the bottom wall of the recess is raised by a spring 128 and moves a pawl 129 into engagement with a ratchet wheel 130 restraining the roller 126 from winding up the cord. When the draw bar 6 moves to the left, a projection 131 (Figs. 8 and 9) thereon enters an opening in the rear wall of the recess and thrusts the cup a short distance outward so that it may be readily grasped. When the cup is left free hanging by the cord 125 the latter depresses the part 127 so that the ratchet is released and the cup drawn back into the recess.

To rinse the cup, it is pressed downward upon a perforated-plate 132 equipped with a depending rod 134, (Fig. 4), the lower end of which is normally engaged by a detent 133 provided upon the balance weight 11. The rocking of this weight, effected previously in connection with the introduction of the coin necessary to operate the machine, serves to release the detent from the rod end, and the rod and plate are thus free to descend under the pressure imposed thereupon, against the action of a spring 135, (Fig. 1), thereby opening a valve 136. Water then flows through pipe 137 to a rose nozzle 138, whence it is discharged, washes the cup, and escapes through the perforations in plate 132 to the drain pipe 46.

The operation, as a whole, is substantially as follows:—The handle 97 is first moved in the proper direction to bring the pump cylinder 90 into position for coöperation with the chamber 85 corresponding to the flavoring extract selected, the movement of the cylinder being produced by means of the connection 95 of its frame 92 with the shaft 96 and resulting in the disposition of its nozzle 94 directly above the socket 89 of the selected chamber. A coin is then inserted in the passage or chute 13 and falls therefrom into the cup 14 provided in the abutment bar 9, the weight of the coin depressing said bar sufficiently to disengage it from the stop 8 on the front end of the draw-bar 6 and, at the same time, to disengage detent 133 on weight 11 from the end of the cup rod 134, so that both the draw-bar and the cup are unlocked. The handle 3 is next grasped and pulled forward, i. e., in the direction of the arrow in Fig. 7, which action produces, initially, a partial rotation of shaft 2, and a consequent movement of bar 6 in the same direction through the agency of the parts 4 and 5, said bar being at that time free to move, since its latch 26 is depressed by the cam 29 on bar 16 and thus disengaged from slots 33. As soon as bar 6 starts to move forward, pin 24 is raised out of the seat at the front end of cam 23 and caused to engage notch 24ª in bar 16, thereby locking the latter against movement until the rear seat 28 is brought beneath pin 24, whereupon the pin will be lowered by its controlling spring and thus release bar 16, such action taking place at the end of the forward movement of bar 6. Prior to this release, however, the ejector 15 on the front end of bar 6 engages the coin and pushes it downward through the cup. Bar 6 continues its forward movement until stopped by the engagement of latch 26 with slots 27, and during such movement its tappet 36 actuates lever 37 and, also, through the agency of the parts 50 and 58, the levers 51 and 59, thereby opening the valves 38, 52, 57 and 60, with the result that water from the main supply pipe 39 flows through pipe 40 into the interior of the mixing vessel 42, through pipe 53 into the beater chamber 54, and through pipe 61 and sprayer 62 into the upper vessel 63, while any air or gas contained in chamber 54 is allowed to escape therefrom, due to the opening of valve 57. At the same time, the drain valve 45 is raised into open position by the engagement of cam 43, carried by bar 6, with the lower end of the valve rod 44, and is held in such position by the engagement of bar 48 in notch 49 in said rod end, so that the water used for washing vessels 42 and 63 is drained off continuously during the washing operation. During the initial, or forward movement of shaft 2, the piston 102 of the previously-adjusted pump is drawn outwardly of the pump cylinder 90 by the action of crank arm 100, but slightly before this stroke commences, the cam 99 acts on cylinder arm 113 and rocks the cylinder about its trunnions 91, so that the nozzle end of the cylinder is depressed and forced into the socket 89 of the measuring chamber 85 therebeneath, making a tight joint with said socket. When the piston moves outward, it will then exhaust the air from the measuring chamber and will ultimately raise valve 88 and draw the flavoring extract into said chamber until the latter is filled and closed by valve 88 seating in the upper end of the chamber. Valve 103 in the pump cylinder then opens, to prevent over-suction and leakage. About the time that piston 102 completes its outstroke, the forward movement of bar 6 is terminated by the engagement of latch 26 with slots 27, such engagement being practically coincident with the release of bar 16 by pin 24 due to the latter dropping into seat 28. The forward movement of bar 16 then commences by reason of the pull exerted upon said bar by cord 21, and during this movement lug 81 releases latch 47 from lever 37, whereupon that lever and, consequently, the levers 51 and 67 are automatically returned to normal position, thereby closing the valves 38, 52, 57 and 60 which have remained open after the forward movement of bar 6 has ceased, the drain valve 45 still remaining open. The lug 82 on bar 16 then operates to release latch 68 from lever 67, thus permitting the latter to be rocked by its spring 83 and to open valve 69 in order to charge the beater chamber 54 with the necessary aerating medium. Bar 16 then terminates its forward movement and is locked by the engagement of pin 24 in notch 24$^b$, but before ceasing its movement its cam depresses latch 26 and thereby unlocks bar 6. This completes the first half of the operation of the machine.

The second half-cycle of movements is produced by a rearward movement of handle 3 which initially imparts a reverse rotation to shaft 2, thereby returning bar 6 and the associated parts to original position. During this rotation, piston 102 is forced inwardly of cylinder 90 and, in consequence, expels the charge of flavoring extract contained in chamber 85 and forces it through pipes 86 and 106 into vessel 63, the valve 88 closing the bottom of said chamber. Spring 112 then acts to rock the nozzle end of cylinder 90 upward, by pulling the other end thereof downward against the low side of cam 99. In the meantime, however, the tappet 70 on bar 6 strikes against the extension 71 of bar 48, thus rocking the latter backward and disengaging it from rod 44 which then drops, closing the drain valve 45. When shaft 2 is rotated by the reverse motion of handle 3, the compressed air or gas and water contained in chamber 54 are mixed together, by the action of the beater, due to the rotation of the beater pinion 114 by gear 73. As said gear continues its rotation, the pin 72 thereon retracts latch 75, whereupon arm 74 drops and opens valve 79; aerated water then flows through pipe 80 into vessel 42 and mixes with the flavoring extract which has previously been washed thereinto from vessel 63 by water supplied to the latter through pipe 61 consequent upon the opening of valve 60 by tappet 64 on bar 6, the mixture raising the float valve 118 into position to close the passage connecting the vessels 63 and 42 as soon as the latter becomes filled. Bar 6 then concludes its return movement, during which time its tappet 66 operates to close the gas valve 69, and at the end of this movement, it is locked by the engagement of latch 26 with slots 33. Bar 16 is then released by pin 24 becoming disengaged from slot 24$^b$ and likewise commences its return movement, and as it moves rearwardly, its lug 119 releases latch 116 which, in turn, releases lever 59, the latter returning to normal position and closing valve 60. At the conclusion of its return movement, bar 16 unlocks bar 6, due to the engagement of the cam 29 and latch 26, and all parts are then in their original positions and ready for a second operation. The aerated contents of vessel 42 may then be siphoned therefrom by opening valve 121, the discharge taking place through the spout end of pipe 122.

What I claim is:

1. In a machine for mixing and delivering beverages, a mixing vessel, means for supplying beverage ingredients thereto, a conduit for delivering rinsing water to the said vessel, a conduit for draining rinsing water from the said vessel, and means for opening and closing the said conduits between the delivery of successive charges of beverage ingredients into the said mixing vessel.

2. In a beverage mixing and delivering machine, a plurality of measuring chambers, an air pump, means for putting the said pump into communication with any one of the measuring chambers at will, and conduits respectively supplying beverage ingredients to each of the said chambers.

3. In a beverage mixing and delivering machine, a plurality of measuring chambers, a socket on each of the said chambers, an air pump provided with a nozzle adapted to make a joint with each of the said sockets on the said chambers, means for moving said nozzle into alinement with any desired socket, and means for closing the joint between the nozzle and socket thus brought into alinement.

4. In a beverage mixing and delivering machine, a measuring chamber, a conduit supplying a beverage ingredient thereto, means for exhausting air from and compressing air within the said measuring chamber, and a valve for closing the said chamber when completely filled with beverage ingredient drawn in by the exhaustion of air therefrom and for preventing escape of air from the said chamber when the latter is completely emptied of the beverage ingredient by compression of air therein.

5. In a beverage mixing and delivering machine, a measuring chamber, a conduit supplying a beverage ingredient thereto, a pump alternately exhausting and compressing air within the said chamber, a valve for closing the said chamber when filled with beverage ingredient drawn in by exhaustion of air therefrom, and a valve for relieving the partial vacuum in the pump when the first mentioned valve is closed.

6. In a beverage mixing and delivering machine, a plurality of conduits, valves controlling the said conduits, a spindle comprising two parts, valve operating mechanism actuated by one part of the said spindle, a beater device actuated by the other part of the said spindle, a clutch connecting the parts of the said spindle, and means for disengaging the clutch to leave the valve actuating part of the spindle at rest while the beater actuating part of the spindle continues to rotate.

7. In a beverage mixing and delivering machine, a plurality of conduits, valves controlling the said conduits, a reciprocatory draw bar, means for manually moving said draw bar in both directions, a reciprocatory follower bar, a dash pot regulating the movement of the follower bar, a spring connection between the draw bar and follower bar for causing the latter bar to follow the movements of the former bar, means for locking each bar as it reaches each end of its stroke, means for unlocking each bar by a movement of the other bar, and tappets on the said bars for actuating the said valves.

8. In a beverage mixing and delivering machine, the combination of a mixing vessel provided at its top with an inlet passage having a valve seat therein; means for supplying beverage ingredients to said passage; a float valve adapted to occupy said seat when said vessel is filled to a predetermined extent with liquid, to close said passage; and valve-controlled conduits communicating with the lower portion of said vessel.

9. In a beverage mixing and delivering machine, the combination of a mixing vessel having a discharge outlet; separate means for supplying a flavoring ingredient and an aerated liquid to said vessel for admixture therein; additional means for supplying rinsing water to said vessel; means for opening and closing the last-named means between successive charges of mixture; and means for opening and closing said outlet.

10. In a beverage mixing and delivering machine, the combination of a mixing vessel; means for supplying beverage ingredients to said vessel for admixture therein; and means for rinsing said vessel prior to each charge of ingredients.

11. In a beverage mixing and delivering machine, the combination of a mixing vessel having a valve-controlled outlet; means for supplying beverage ingredients to said vessel for admixture therein; a valve-controlled conduit for supplying rinsing water to said vessel; and means for opening and closing the outlet and conduit valves between successive charges of mixture.

12. In a beverage mixing and delivering machine, the combination of a mixing vessel; means for supplying beverage ingredients to said vessel; and means for automatically spraying the interior of said vessel, to wash the same, prior to each charge of ingredients.

13. In a beverage mixing and delivering machine, the combination of a pair of communicating, superposed vessels; means for supplying aerated water to the lower vessel; means for supplying a flavoring ingredient to the upper vessel; and additional means for supplying water to said upper vessel, to wash the flavoring ingredient therein into said lower vessel for admixture with the aerated water therein.

14. In a beverage mixing and delivering machine, the combination of a pair of communicating, superposed vessels; means for supplying aerated water to the lower vessel; means for supplying a flavoring ingredient to the upper vessel; additional means for supplying water to said upper vessel, to wash the flavoring ingredient therein into said lower vessel for admixture with the aerated water therein; and means for automatically closing communication between said vessels when the lower vessel is filled.

15. In a beverage mixing and delivering machine, the combination of a pair of communicating, superposed vessels; means for supplying aerated water to the lower vessel; means for supplying a flavoring ingredient to the upper vessel; additional means for supplying water to said upper vessel, to wash the flavoring ingredient therein into said lower vessel for admixture with the aerated water therein; and means for rinsing the lower vessel after each discharge of mixture therefrom.

16. In a beverage mixing and delivering machine, the combination of a pair of communicating, superposed vessels; means for supplying aerated water to the lower vessel; means for supplying flavoring ingredient to the upper vessel; additional means for supplying water to said upper vessel, to wash the flavoring ingredient therein into said lower vessel for admixture with the aerated water therein; means for automatically closing communication between said vessels when the lower vessel is filled; and means for rinsing the lower vessel after each discharge of mixture therefrom.

17. In a beverage mixing and delivering machine, the combination of a pair of communicating, superposed vessels; a separate conduit leading to each vessel for supplying rinsing water thereto; a drain conduit for such rinsing water leading from the lower vessel; means for supplying a flavoring ingredient to the upper vessel; means for supplying an aerated liquid to the lower vessel for admixture with the flavoring ingredient from the upper vessel; and means for automatically closing communication between said vessels when the lower vessel is filled.

18. In a beverage mixing and delivering machine, the combination of a pair of communicating, superposed vessels; a separate conduit leading to each vessel for supplying rinsing water thereto; a drain conduit for such rinsing water leading from the lower vessel; means for supplying a flavoring ingredient to the upper vessel; means for supplying an aerated liquid to the lower vessel for admixture with the flavoring ingredient from the upper vessel; means for automatically closing communication between the vessels when the lower vessel is filled with the mixture; a discharge conduit for the mixture leading from said lower vessel; and valve means for controlling the passage of the liquid through the several conduits.

19. In a beverage mixing and delivering machine, the combination of a measuring chamber open at both ends; a supply pipe connected to the lower end thereof; a valve movable in said chamber to open and close either end; and an air pump having a nozzle movable into and out of the upper end to connect the pump and chamber.

20. In a beverage mixing and delivering machine, the combination of a measuring chamber open at both ends; a supply pipe connected to the lower end thereof; valve means in said chamber for opening and closing said ends; a rocking air pump having a nozzle adapted to fit in the upper end to connect the pump and chamber; and means for rocking said pump, to insert and withdraw said nozzle into and from said upper end.

21. In a beverage mixing and delivering machine, the combination of a measuring chamber open at both ends; a supply pipe connected to the lower end thereof; valve means in said chamber for opening and closing said ends; an air pump mounted for rocking movement above said chamber and provided at one end with a depending nozzle adapted to fit in the upper end of the chamber, to connect the latter with the pump; and a cam operative upon the other end of the pump to rock the same and insert and withdraw said nozzle into and from said upper end.

22. In a beverage mixing and delivering machine, the combination of a plurality of measuring chambers and an air pump, said chambers and pump constituting companion parts, one of which is movable relatively to the other, to position the pump for coöperation with a selected chamber; and means for putting said pump into communication with said chamber when so positioned.

23. In a beverage mixing and delivering machine, the combination of a plurality of measuring chambers, and an air pump arranged thereabove, said chambers and pump constituting companion parts, one of which is movable; means for shifting said movable part laterally relatively to the other part, to position the pump for coöperation with a selected chamber; and means for putting said pump into communication with said chamber when so positioned.

24. In a beverage mixing and delivering machine, the combination of a plurality of measuring chambers; an air pump; means for shifting said pump laterally relatively to said chambers, to position it for coöperation with a selected chamber; and means for putting said pump into communication with said chamber when so positioned.

25. In a beverage mixing and delivering machine, the combination of a plurality of measuring chambers; an air pump having a nozzle adapted for interchangeable engagement with said chambers to connect the latter with the pump; means for shifting said pump laterally relatively to said chambers, to position said nozzle for engagement with a selected chamber; and means operative upon said pump to move said nozzle into such engagement when the pump is so positioned.

26. In a beverage mixing and delivering machine, the combination of a measuring chamber open at both ends; a liquid supply pipe connected to one end; a float valve movable within said chamber to open and close either end; and means for exhausting air from and compressing air within said chamber.

27. In a beverage mixing and delivering machine, the combination, with a plurality of conduits, and controlling valves therefor; of a reciprocatory draw bar; means for operating said bar; a reciprocatory follower bar; connecting means between the bars, for causing the second-named bar to follow the movements of the first-named bar; a dash-pot for regulating the speed at which said second-named bar moves; and members provided on said bars for actuating the said valves.

28. In a beverage mixing and delivering machine, the combination, with a plurality of conduits, and controlling valves therefor, of a reciprocatory draw bar; means for operating said bar; a reciprocatory follower bar; connecting means between the bars, for causing the second-named bar to follow the movements of the first-named bar; a dash-pot for regulating the speed at which said second-named bar moves; means for locking each bar as it reaches each end of its stroke; means for subsequently unlocking each bar; and members provided on said bars for actuating the said valves.

29. In a beverage mixing and delivering machine, the combination, with a plurality of conduits, and controlling valves therefor; of a reciprocatory draw bar; means for operating said bar; a reciprocatory follower bar; connecting means between the bars, for causing the second-named bar to follow the movements of the first-named bar; a dash-pot for regulating the speed at which said second-named bar moves; means for locking each bar as it reaches each end of its stroke; means for unlocking each bar by a movement of the other bar; and members provided on said bars for actuating the said valves.

30. In a beverage mixing and delivering machine, the combination, with a plurality of conduits, and controlling valves therefor; of a reciprocatory draw bar; means for operating said bar; a reciprocatory follower bar; connecting means between the bars, for causing the second-named bar to follow the movements of the first-named bar; a piston attached to the rear end of the second-named bar; a fluid-containing cylinder wherein said piston works having a conduit connecting the ends thereof, to permit circulation of the liquid; a valve for regulating the speed at which the fluid passes through said conduit; and members provided on said bars for actuating the said valves.

31. In a beverage mixing and delivering machine, the combination, with a plurality of conduits, and controlling valves therefor; of a reciprocatory draw bar; means for operating said bar; a reciprocatory follower bar; connecting means between the bars, for causing the second-named bar to follow the movements of the first-named bar; a fluid-actuated device attached to the rear end of the second-named bar for regulating the speed at which that bar moves; and members provided on said bars for actuating the said valves.

ROLLS PERCIVAL LINK.

Witnesses:
G. DONALD HARRISON,
HERBERT D. JAMESON.